United States Patent
Gawali et al.

(10) Patent No.: US 10,064,521 B1
(45) Date of Patent: Sep. 4, 2018

(54) AUTOMATED MULTI-DISH COOKING MACHINE

(71) Applicants: Ajay R Gawali, Chandler, AZ (US);
Thomas R Plourde, Tucson, AZ (US);
Han-Jay Huynh, Tucson, AZ (US)

(72) Inventors: Ajay R Gawali, Chandler, AZ (US);
Thomas R Plourde, Tucson, AZ (US);
Han-Jay Huynh, Tucson, AZ (US)

(73) Assignee: YANTRA, LLC, Chandler, AZ (US)

( * ) Notice: Subject to any disclaimer, the term of this patent is extended or adjusted under 35 U.S.C. 154(b) by 709 days.

(21) Appl. No.: 14/596,212

(22) Filed: Jan. 13, 2015

Related U.S. Application Data

(60) Provisional application No. 61/927,635, filed on Jan. 15, 2014.

(51) Int. Cl.
| | | |
|---|---|---|
| *A47J 37/12* | (2006.01) | |
| *G07F 9/10* | (2006.01) | |
| *H05B 6/12* | (2006.01) | |
| *A47J 44/02* | (2006.01) | |
| *B65D 83/00* | (2006.01) | |
| *B65D 83/06* | (2006.01) | |

(52) U.S. Cl.
CPC ............. *A47J 44/02* (2013.01); *B65D 83/00* (2013.01); *B65D 83/06* (2013.01)

(58) Field of Classification Search
CPC .............. A47J 27/18; A47J 2027/006; A47J 2027/008; A47J 27/0817; A47J 44/02; A47J 27/004; A47J 43/046; A47J 27/62; A47J 37/1228; B65D 83/00; B65D 83/06; A23L 5/13; G07F 9/105; G07F 17/0078

USPC ......... 99/330, 331, 339, 352, 403, 407, 325, 99/329 R, 356, 357, 476, 479
See application file for complete search history.

(56) References Cited

U.S. PATENT DOCUMENTS

| | | | | |
|---|---|---|---|---|
| 2,215,929 A | * | 9/1940 | Husk .................... | A47J 37/1219 138/96 R |
| 3,499,380 A | * | 3/1970 | Gongwer ............... | A47J 37/045 99/345 |
| 3,811,374 A | * | 5/1974 | Mann ....................... | A47J 27/04 126/369 |
| 4,155,294 A | * | 5/1979 | Langhammer ........ | A47J 37/047 219/389 |
| 4,167,585 A | * | 9/1979 | Caridis .................... | A21B 1/48 426/233 |
| 4,169,419 A | * | 10/1979 | Burgess ............... | A01C 15/001 111/100 |

(Continued)

*Primary Examiner* — Eric Stapleton
(74) *Attorney, Agent, or Firm* — Sheetal Karnik

(57) ABSTRACT

The present invention is incorporated in an automated multi-dish cooking machine that is internet enabled and can be programmed to cook multiple dishes at any given time. The cooking machine can also store various recipes and food can be cooked in different portion sizes from different parts of the world at the same time. Based on the selected recipe, various items can be dispensed in measured quantities to the cooking vessel. The cooking machine also includes stirring assembly that can mix and stir food ingredients at programmed time intervals as per the details of selected recipe. This cooking machine can be operated from a remote location and may be programmed to start cooking different meals within each cooking vessels at different times since all the recipes do not call for same time for the entire cooking process.

20 Claims, 16 Drawing Sheets

(56) References Cited

U.S. PATENT DOCUMENTS

| | | | | |
|---|---|---|---|---|
| 4,203,358 A * | 5/1980 | Vogt | A47J 37/047 | 219/389 |
| 4,295,419 A * | 10/1981 | Langhammer | A47J 37/047 | 219/389 |
| 4,491,065 A * | 1/1985 | Poulson | A47J 37/047 | 126/21 A |
| 4,503,760 A * | 3/1985 | Pryputsch | F24C 15/322 | 126/21 A |
| 4,517,651 A * | 5/1985 | Kawasaki | B67D 1/0041 | 222/129.4 |
| 4,598,378 A * | 7/1986 | Giacomo | G07F 5/22 | 194/200 |
| 4,646,627 A * | 3/1987 | Bartfield | A21C 1/00 | 222/372 |
| 4,649,810 A * | 3/1987 | Wong | A47J 27/14 | 222/501 |
| 4,722,267 A * | 2/1988 | Galockin | A47J 37/1223 | 126/374.1 |
| 4,726,288 A * | 2/1988 | Lansing | A47J 27/004 | 219/432 |
| 4,732,080 A * | 3/1988 | Vita | A47J 27/18 | 99/330 |
| 4,748,902 A * | 6/1988 | Maurantonio | A47J 37/1228 | 99/326 |
| 4,763,572 A * | 8/1988 | Kuehl | A01K 59/04 | 34/171 |
| 4,776,317 A * | 10/1988 | Pinnow | A47J 39/02 | 126/21 A |
| 4,803,916 A * | 2/1989 | Tacconi | A47J 27/18 | 99/330 |
| 4,838,455 A * | 6/1989 | Hoeberigs | A47J 37/047 | 221/150 A |
| 4,854,949 A * | 8/1989 | Giles, Sr. | B03C 3/155 | 126/299 D |
| 4,865,864 A * | 9/1989 | Rijswijck | A47J 37/047 | 219/400 |
| 4,898,091 A * | 2/1990 | Rozak | A47J 37/1219 | 99/336 |
| 4,919,950 A * | 4/1990 | Mak | A47J 27/14 | 426/233 |
| 4,938,125 A * | 7/1990 | Wong | A47J 27/14 | 222/168.5 |
| 4,942,807 A * | 7/1990 | Wong | A47J 27/14 | 366/241 |
| 5,052,288 A * | 10/1991 | Marquez | G07F 17/0078 | 222/368 |
| 5,069,116 A * | 12/1991 | Marquez | G07F 17/0078 | 99/330 |
| 5,097,754 A * | 3/1992 | Covington | A47J 36/38 | 126/21 A |
| 5,115,731 A * | 5/1992 | Maitland | G07F 9/105 | 222/370 |
| 5,134,927 A * | 8/1992 | McCarthy, III | A47J 37/047 | 126/21 A |
| 5,148,737 A * | 9/1992 | Poulson | A47J 37/041 | 126/21 A |
| 5,174,470 A * | 12/1992 | North | A47J 37/1228 | 221/150 HC |
| 5,193,444 A * | 3/1993 | Bar-Sheshet | A21B 1/26 | 126/21 A |
| 5,203,253 A * | 4/1993 | Covington | A47J 36/38 | 99/357 |
| 5,249,510 A * | 10/1993 | Rozak | A47J 36/38 | 99/336 |
| 5,259,302 A * | 11/1993 | Chen | A47J 37/044 | 134/132 |
| 5,307,736 A * | 5/1994 | Sorensen | A47J 37/1223 | 99/330 |
| 5,325,766 A * | 7/1994 | Mareels | A47J 37/1228 | 99/357 |
| 5,340,949 A * | 8/1994 | Fujimura | G01G 17/04 | 141/128 |
| 5,345,041 A * | 9/1994 | Swanson | G01G 13/026 | 177/105 |
| 5,361,682 A * | 11/1994 | Crolla | A47J 27/18 | 426/509 |
| 5,367,949 A * | 11/1994 | Nitschke | A47J 37/1228 | 221/150 A |
| 5,386,762 A * | 2/1995 | Gokey | A47J 27/14 | 414/225.01 |
| 5,469,782 A * | 11/1995 | Wong | A47J 27/14 | 99/352 |
| 5,537,915 A * | 7/1996 | Kelly | A47J 37/1228 | 99/336 |
| 5,586,486 A * | 12/1996 | Nitschke | A47J 37/1228 | 99/330 |
| 5,605,091 A * | 2/1997 | Garber | A47J 37/1228 | 99/330 |
| 5,695,669 A * | 12/1997 | Westerberg | A47J 27/62 | 219/411 |
| 5,701,804 A * | 12/1997 | Liebermann | A47J 37/0611 | 99/330 |
| 5,778,767 A * | 7/1998 | Rudesill | A47J 37/1228 | 221/150 R |
| 5,819,636 A * | 10/1998 | Khashoggi | A47J 27/14 | 366/146 |
| 5,881,632 A * | 3/1999 | Fadoul | A47J 27/14 | 222/501 |
| 5,901,640 A * | 5/1999 | Castlebury | A47J 37/1228 | 99/330 |
| 5,974,951 A * | 11/1999 | Kovacs | A47J 37/1228 | 99/333 |
| 6,367,417 B1 * | 4/2002 | Gal | A01K 5/0283 | 119/51.11 |
| 6,401,600 B1 * | 6/2002 | Schleh | A47J 37/1228 | 99/329 R |
| 6,647,864 B1 * | 11/2003 | Fang | A47J 27/14 | 99/327 |
| 6,843,166 B1 * | 1/2005 | Li | A47J 27/14 | 99/327 |
| 6,869,633 B2 * | 3/2005 | Sus | A47J 37/1228 | 426/438 |
| 6,871,676 B2 * | 3/2005 | Sus | A47J 37/1228 | 141/168 |
| 7,307,243 B2 * | 12/2007 | Farkas | A21B 1/48 | 219/388 |
| 7,412,922 B2 * | 8/2008 | McLemore | A47J 37/1209 | 99/403 |
| 7,619,188 B2 * | 11/2009 | Oghafua | A47J 27/004 | 219/600 |
| 7,802,593 B2 * | 9/2010 | Koerner | G07F 17/0071 | 141/104 |
| RE42,513 E | 7/2011 | Clothier | | |
| 8,205,460 B2 * | 6/2012 | Russo | A23G 9/045 | 62/303 |
| 8,210,396 B2 * | 7/2012 | Girard | A47J 31/402 | 222/129.1 |
| 8,276,505 B2 * | 10/2012 | Buehler | A47J 44/00 | 99/326 |
| 8,448,567 B2 * | 5/2013 | Martin | B67D 1/0046 | 141/103 |
| 8,590,446 B1 * | 11/2013 | Bussis | A47J 33/00 | 99/419 |
| 8,618,448 B2 * | 12/2013 | Alexander | A47G 19/2288 | 165/58 |
| 8,759,721 B1 * | 6/2014 | Alexander | A47G 19/2288 | 165/58 |
| 8,800,820 B2 * | 8/2014 | Girard | A47J 31/402 | 137/614.11 |
| 8,820,219 B2 * | 9/2014 | Buehler | A47J 44/00 | 134/115 R |
| 9,114,336 B2 * | 8/2015 | Evraets | B01D 29/09 | |
| 9,155,417 B2 * | 10/2015 | Girard | A47J 31/402 | |
| 9,373,210 B2 * | 6/2016 | Wittern, Jr. | F25D 17/065 | |
| 9,730,542 B2 * | 8/2017 | Storek | A47J 27/002 | |
| 2003/0205147 A1 * | 11/2003 | Schackmuth | A47J 37/1228 | 99/407 |

(56) References Cited

U.S. PATENT DOCUMENTS

| | | | | |
|---|---|---|---|---|
| 2004/0025707 A1* | 2/2004 | Iori | A47J 27/18 | 99/404 |
| 2004/0103795 A1* | 6/2004 | McLemore | A47J 37/1209 | 99/403 |
| 2005/0193898 A1* | 9/2005 | Sus | A47J 37/1228 | 99/407 |
| 2006/0043088 A1* | 3/2006 | Ancona | A47J 27/62 | 219/720 |
| 2008/0060527 A1* | 3/2008 | Battani | A47J 27/18 | 99/330 |
| 2008/0190301 A1* | 8/2008 | Peng | A47J 27/004 | 99/348 |
| 2009/0057341 A1* | 3/2009 | Girard | A47J 31/402 | 222/129.1 |
| 2009/0087534 A1* | 4/2009 | McLemore | A47J 37/1209 | 426/523 |
| 2012/0305605 A1* | 12/2012 | Vassaux | B67D 1/0005 | 134/93 |
| 2013/0002108 A1* | 1/2013 | Girard | A47J 31/402 | 312/237 |
| 2013/0200064 A1* | 8/2013 | Alexander | A47G 19/2288 | 219/441 |
| 2013/0216673 A1* | 8/2013 | Storek | A47J 27/62 | 426/509 |
| 2014/0018943 A1* | 1/2014 | Lee | B65D 83/0011 | 700/90 |
| 2014/0109774 A1* | 4/2014 | Fukumori | A23L 1/10 | 99/330 |
| 2014/0165607 A1* | 6/2014 | Alexander | A47G 19/2288 | 62/3.3 |
| 2014/0305927 A1* | 10/2014 | Alexander | A47G 19/027 | 219/387 |
| 2014/0346188 A1* | 11/2014 | Girard | A47J 31/402 | 222/129.1 |
| 2016/0135635 A1* | 5/2016 | Boniello | A47J 27/004 | 99/403 |

* cited by examiner

AUTOMATED MULTI-DISH COOKING MACHINE

CROSS REFERENCE TO RELATED APPLICATION

The present application claims priority of the United States Provisional Utility Patent Application entitled "Internet Enabled Automated and Customized Cooking Machine" having Ser. No. 61/927,635 filed on Jan. 15, 2014, which is entirely incorporated herein by reference.

FIELD OF INVENTION

The present invention relates to a multi-dish cooking device and more particularly, to an automated programmable device that can be controlled from a remote location and cook multiple dishes at the same time.

BACKGROUND

People cook food every day. Preferences of food vary between individuals. Some prefer to eat out while others prefer a home-cooked meal. With increased globalization and awareness of different ethnicity, people like to sample different cuisines. Eating at restaurants to try different cuisines on a regular basis can get very expensive. In addition, with increasing awareness of healthy food, people like to modify recipes that suit their health needs which cannot be tailored as well at restaurants.

Cooking food at home can become almost a daily chore of life around the planet. With increasing time and budget constraints for working individuals and families as well as those that get tired of cooking every day. Moreover, mastering recipes in terms of precision in the quantities of ingredients as well as the right amount of cooking time might become cumbersome for certain individuals.

Various automatic cooking machines have been devised to facilitate single-dish cooking of certain cuisines. For example, a slow cooker (or crock pot) is a well-known example of single dish cooking device. In a "slow cooker", all the ingredients go into one pot and get cooked together. Although, single-dish cooking machines are well-suited for some cooking, they would not be suitable for the purposes of cooking multiple dishes at the same time, like if a user wanted scrambled eggs, bacon and hash browns.

What is needed is an automated multi-dish cooking machine that can cook more than one dish at the same time and wherein all the meals can end at the same time.

SUMMARY

The present invention in embodied in an automated multi-dish cooking machine 1. For the purposes of this specification, a "multi-dish" cooking machine is a machine that can cook at least two separate dishes at the same time. For example, a multi-dish cooking machine could cook rice and chicken at the same time, but not in the same pot.

The cooking machine 1 can remotely cook programmed dishes for one or more persons with different portion sizes and calorie count according to a predetermined recipe. In addition, the cooking machine 1 can programmatically store and follow multiple recipes.

The cooking machine 1 preferably has a wireless controller connected to internet so an authorized user can add and modify any food recipe at any time. A user can also control the operation such as start, pause, stop, and view, daily and weekly cooking program from the front display panel of the cooking machine, mobile or, smartphone via supporting mobile application, blue tooth enabled device, or over internet from a remotely located computer using an internet browser. This automated multi-dish cooking machine 1 also provides a built-in touch based cooking console that can be accessed from front display panel.

The automated multi-dish cooking machine 1 is preferably controlled using a microcontroller and attached input and output devices such as temperature sensor, touch controlled screen with input options of recipes (input) and stepper motors, servo motors, linear actuators (output). In addition to the microcontroller or central processor unit (CPU), there can be internal storage memory, a Wi-Fi controller module, a RF controller module, a Bluetooth enabler, and a display controller module. The internal memory will have ability to store recipes. The unit can also be equipped with an overload protector that can shut down the unit in case of power fluctuations beyond the set threshold safe value and also when the temperature of the cooking vessels exceed than 550 degree F.

The other supporting electronic circuitry preferably includes the internal AC to DC converter, DC power supply for each module, atmospheric pressure sensor, humidity sensor, level sensor, and small piezo electric speaker for audio.

The recipes can be electronically sent to the cooking machine from a centralized database of recipes and can vary depending on the subscription of each user. The user based security and recipe-push mechanism is controlled using software hosted on the application server.

This automated multi-dish cooking machine 1 can be programmed to store user feedback for each recipe and update the recipe according to the feedback.

The automated multi-dish cooking machine 1 can also the track historical trend of the recipe cooked, calories consumed, and the real-time inventory of the spices, dry ingredients, and liquids. In addition, the cooking machine 1 may also provide each recipe specific details such as calories provided, nutrient value, and impact on environment in terms of greenhouse gas emission.

This automated cooking machine can display and send email list of the ingredients needed to be purchased or refilled for specific recipe to the user. This may also serve as a checklist for shopping.

In addition, automated multi-dish cooking machine 1 can send visual, audio and email notification to the user when the recipe specific dish is ready based on the individual preferences.

A user can select a certain recipe from the multiple recipes programmed in the automated multi-dish cooking machine 1. Single recipe or multiple recipes can be selected for cooking more than one dish with varying cooking schedules. Upon initializing the program, the storage compartments can be scanned with sensor to check the ingredients that would be required for the recipe. If one or more ingredients are found to be below the pre-set threshold levels, a warning message can be displayed on the control screen in order to refill before starting the cooking process. Once the recipes are loaded, the automated multi-dish cooking machine 1 can calculate cooking times for each selected recipe and start the cooking process at an appropriate time such that all the dishes complete cooking at the same time. The automated multi-dish cooking machine 1 also conducts self-check routine to ensure that all the moving and non-moving parts are in right place and are powered.

Automated multi-dish cooking machine 1 preferably includes a plurality of cooking vessels with lids that are equipped with a stirrer that is in turn connected to a motor assembly that controls its operation. The contents in the cooking vessel can be stirred, mixed or generally agitated with this stirrer during the cooking process at appropriate programmable intervals as per the recipe.

The stirrer can be of various designs appropriate for the cooking process as per the selected recipe. This stirrer can be detached from the motor assembly for cleaning. In addition, the lids of cooking vessels can be partially opened for collecting food ingredients dispensed in the cooking vessel as per the selected recipe. Once the three cooking vessels are positioned on the machine, the rotating table that houses the vessels rotates into position where the dispensing apparatus' are located. Then, when necessary, the lid open while in line with the dispensing apparatus to allow the dispensing (insertion) of ingredients. This embodiment utilizes two separate motors for carrying out operations of opening and closing of lid as well as stirring/mixing/agitating food independent of each other.

One embodiment of the automated cooking machine comprises a food ingredient dispenser having separate storage and dispensing containers for each ingredient. The food ingredient dispenser preferably comprises a refrigerated items dispenser assembly, dry ingredients storage and dispenser assembly, spice storage and dispenser assembly, and liquid storage and dispenser assembly. The refrigerated items dispenser assembly dispenses fresh ingredients that can be refrigerated or non-refrigerated such as meat, seafood, vegetables and fruits into the cooking vessel as per the programmed recipe selected by the user. The dry ingredients storage and dispenser unit comprises of plurality of dry ingredient dispensers that can store dry ingredients for an extended period of time and dispenses only measured amount of dry ingredient in the cooking vessel as per the programmed recipe requirement. The spice storage and dispenser assembly comprises of a plurality of spice containers that can store spices for an extended period of time and dispenses only measured amount of spice in the cooking vessel at the appropriate time as per the programmed recipe. The liquid storage and dispenser assembly comprises of a plurality of liquid containers that can store liquids such as oils, vinegar, water, juices to name a few and dispense measured amount of liquid into the cooking vessel at appropriate time as per the programmed recipe.

The temperature and timing of the heating device can be set and adjusted upon command by the program as per the recipe selected by the user. The ingredients of the cooking vessel can be cooked for the prescribed times and are stirred/mixed when needed as per the recipe at rates appropriate for the ingredients as specified by the program of the selected recipe. Upon completion of cooking of one or more dishes, a visual and customizable audio, and an optional internet enabled notification can be sent out to the user using a built-in program. At the end of cooking, the device preferably stores the improved recipe based on user experience.

This internet enabled automated and customized cooking machine would therefore be advantageous for people who desire to automatically cook multi-dish recipes at home. In addition, the food preparation will be reproducible and can be programmed to finish cooking at a set time desirable for the user.

It is an object of the present invention to not only cook commonly known soups and dishes, but also program to cook virtually any dish from different countries based on known and published recipe with different portion sizes and calorie intake.

It is also an object of this invention to store and learn the improved recipe based on the user experience.

It is also an object of this invention to provide an automated cooking machine that can be started from a remote location.

Other features, objects and advantages of the invention are described in the following detailed description and will be readily apparent to those skilled in the art from the detailed description and accompanying drawings of the illustrative embodiment.

BRIEF DESCRIPTION OF THE DRAWINGS

Embodiments of the disclosure will become more fully understood from the detailed description and the accompanying drawings, wherein.

DETAILED DESCRIPTION OF THE PREFERRED EMBODIMENTS

This invention is designed to facilitate cooking of one or more dishes at any given time. With reference to the accompanying FIGS. 1-19 various embodiments of the invention and other features are described below.

Figure 1:
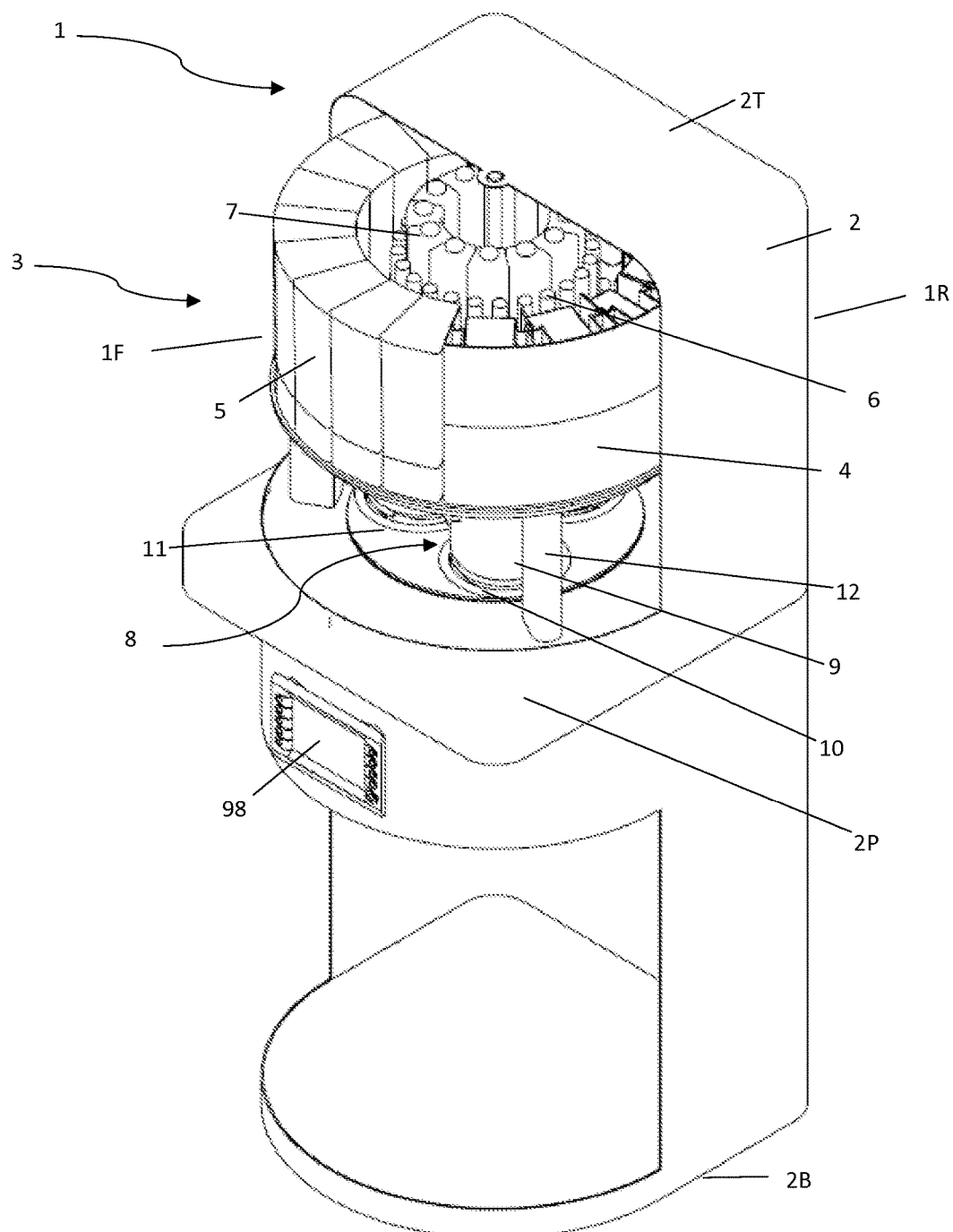
FIG. 1 is a perspective view of the preferred embodiment of the device of the present invention, wherein one of the sides and top of the housing have been broken away to show the primary assembly inside the housing.

FIG. 1 illustrates the preferred embodiment of an automated cooking machine 1, capable of preparing a variety of cooked foods. Cooking machine 1 has a front end 1F, and a rear end 1R. The machine 1 comprises of a housing 2 preferably rectangular or semi-circular in shape and preferably made up of plastic, stainless steel or any anticorrosive material with four or more adjustable feet (not shown). The housing 2 has a top 2T, bottom 2B and a horizontal platform 2P. The machine has an ingredient storage and dispensing assembly 3. The ingredient storage and dispensing assembly 3 includes a refrigerated item dispenser assembly 4, a dry ingredients storage and dispenser assembly 5, spice containers 6, and liquid containers 7.

Below the food ingredients storage and dispensing assembly is the cooking assembly 8. The cooking assembly includes cooking vessels 9 and heating devices 10 for heating of the cooking vessels 9. The heating device 10 may be heated with gas or electric power and controlled via a small computer (not shown) or actual microcontroller (not shown) that can respond to the pre-programmed cooking recipe selected by the user such as by increasing heat, decreasing heat, and increasing or decreasing time at a certain temperature.

Heating elements for the heating device 10 may be electric coil or ceramic based, supplying direct heat or induction heating to the cooking vessels 9. The heating device 10 is supported on a rotary base 11. The rotary base 11 rotates to load and unload the pots and can be rotated as per the cooking recipe program selected by the user. The rotary base 11 is supported on the horizontal platform of housing 2P. The cooking assembly 8 also comprises of a drive shaft assembly housing 12 that encloses drive shaft assembly 58. Drive shaft assembly 58 engages dry ingredients storage and dispenser assembly 5 and refrigerated items dispenser assembly 4 for dispensing food ingredients into cooking vessel 9. Details of drive shaft assembly 58 are discussed in further details in FIG. 9. Control and display panel 98 is housed under the horizontal platform 2P.

Control and Display Panel 98 enables selecting the programs for cooking and is connected to the computer or processor based microcontroller PCB housed in waterproof isolated enclosure (not shown). Temperature sensors (not shown) that sense the temperatures of cooking vessels 9 are connected to microcontroller or main computer (not shown) through cable casing path (not shown). Rotation, positioning of dispensing system 4, 5, 72 and 73 are controlled via control panel 98. Control Panel 98 also provides automatic and manual controls of opening and closing of 15O on the cooking vessels 9 based on the recipe as needed.

Figure 2:
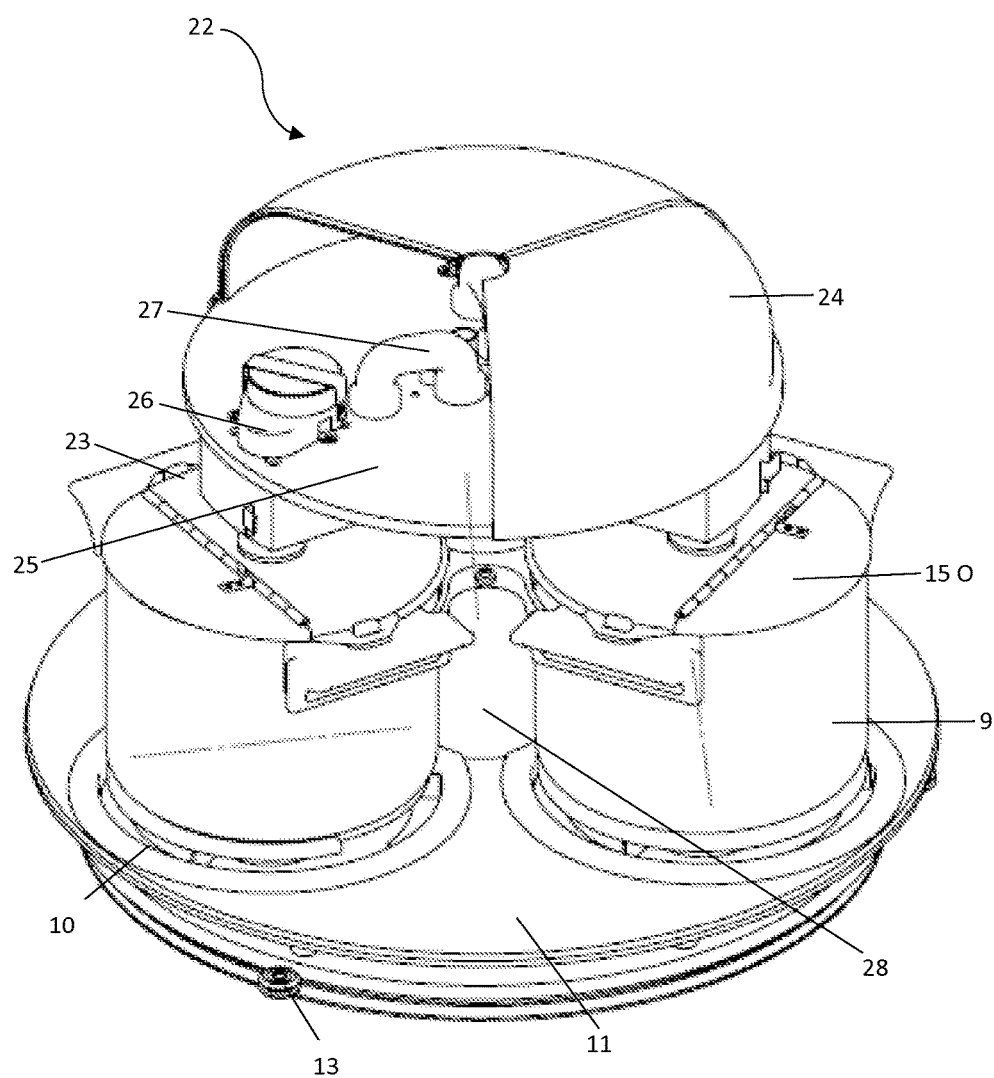
FIG. 2 is a perspective view of the cooking assembly.
Figure 14:
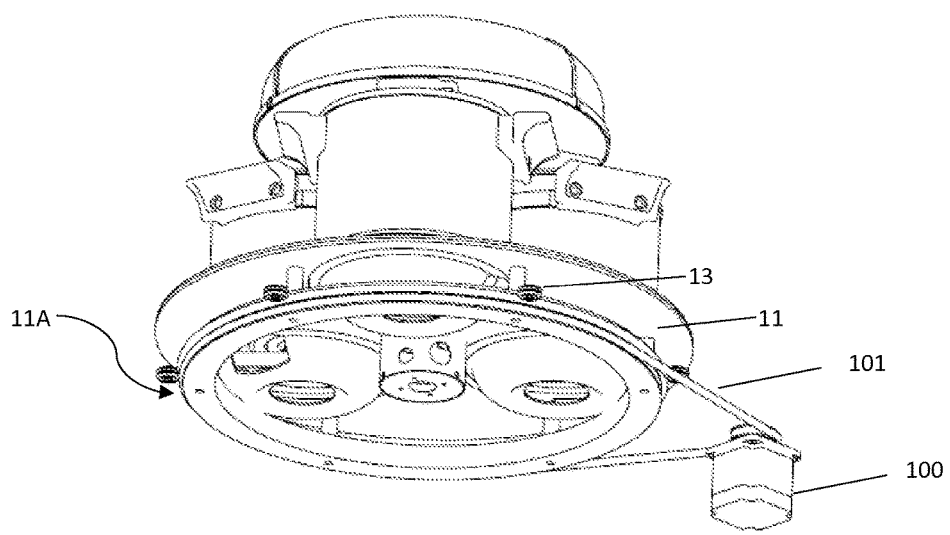
FIG. 14 an enlarged view of rotary base drive assembly.

FIG. 2 is a perspective view of the cooking assembly 8 that illustrates details of the assembly. At the bottom of assembly is the rotary base 11 that functions in rotating the heating device 10 along with plurality of cooking vessels 9 in order to collect food items dispensed by the food ingredients storage and dispensing assembly 3. Rotary base 11 may have a plurality of guiding rollers 13 at the bottom end of the rotary base 11 to elevate the rotary base 11 and to guide the rotary movement of the rotary base 11. Rotary base 11 is attached to a rotary base drive assembly 11A that is shown in FIG. 14. Rotary base drive assembly 11A comprises of stepper motor 100 connected to drive the O-ring 101 (or belt, gear, friction drive or other suitable driver) that in turn drive the rotary base 11. Rotary base 11 is programmed to adjust position of the cooking vessels 9 when the cooking program is selected by the user. The rotary base 11 supports a plurality of heating devices 10 to heat and cook the food that gets dispensed in cooking vessel 9. Cooking vessel 9 may be cooking pots or pans preferably having a conductive base and made of material conducive for cooking.

Figure 15:
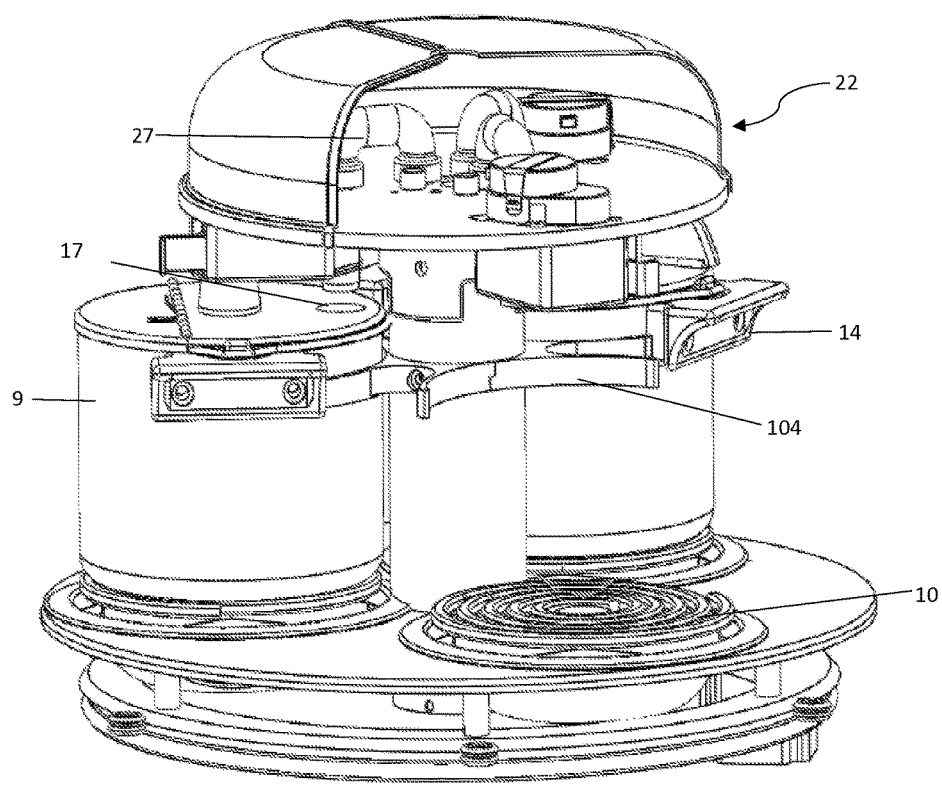
FIG. 15 is an perspective view of the cooking assembly.

Turning to FIG. 15, the cooking vessels 9 are additionally secured on the heating device 10 by plurality of locating arms 104. Locating arms 104 orient the cooking vessel 9 by mating with handles 14. In addition, upon selection of the cooking program, the end 27A of exhaust pipe union 27 locks inside the vent hole 17 located on the fixed lid part 15F, thus locking the cooking vessel 9 into place.

Figure 3:
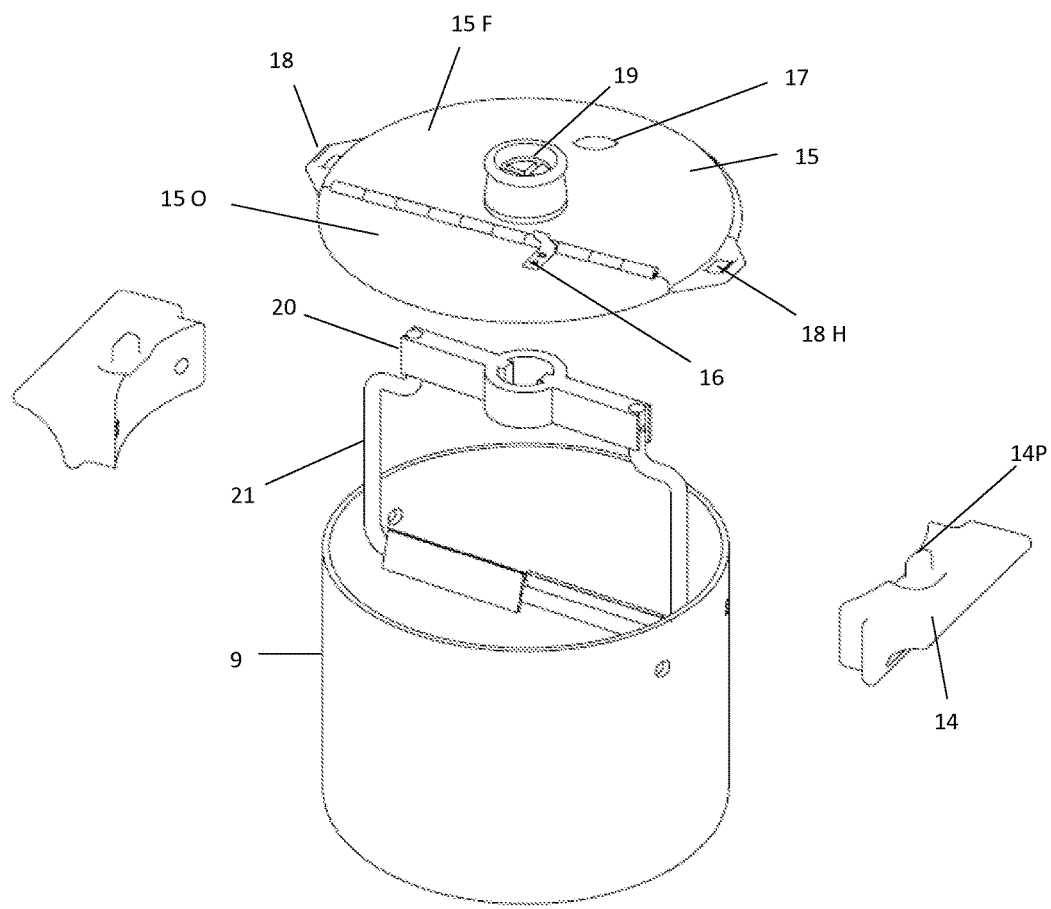
FIG. 3 is an exploded view of the cooking vessel along with the lid.

Turning momentarily to FIG. 3, cooking vessel 9 comprises a detachable handle 14 that has a protrusion 14P which functions to lock the lid 15 of cooking vessel 9 in position. Lid 15 of cooking vessel comprises of a fixed lid part 15F and an open lid part 15O that can be opened or closed as per the recipe requirement of the program selected by the user. The fixed lid part 15F and open lid part 15O are hinged and a tab 16 facilitates opening and closing of open lid part 15O. The fixed lid part 15F comprises of an exhaust hole 17 that enables escaping of the steam built up during the cooking process, two locking lips 18 that extend from opposite sides of 15F with a slot 18H for engaging with protrusion 14P on the handle 14 for securely locking the lid 15 to the cooking vessel 9. The fixed lid part 15F further comprises of a keyed nest 19 that connects to the stirrer nest 20 of the stirrer 21. The stirrer 21 can be interchangeable with other types of stirrers or attachments (not shown) that are used for stirring and mixing food based on the cooking recipe programmed by the user.

Returning to FIG. 2 and FIG. 17, located above the fixed lid part 15F of cooking vessel 9 is a circular cooker interface assembly 22. This is interspersed between the top part 23 of fixed lid 15F and food ingredient storage and dispensing assembly 3. The cooker interface assembly 22 comprises of an upper dome shaped housing 24, a circular base 25 that houses motor assembly 26, which carries a dual function of driving the stirrer 21 and also opening the rotatable lid 15O. The cooker interface assembly 22 further comprises of an inverted exhaust pipe union 27 that is connected to the exhaust assembly 28. One end of the exhaust pipe union 27 makes contact with the exhaust hole 17 of the fixed lid 15F and the other end of exhaust pipe union 27 is connected to the exhaust assembly 28 housed between the plurality of cooking vessels 9.

Figure 16:
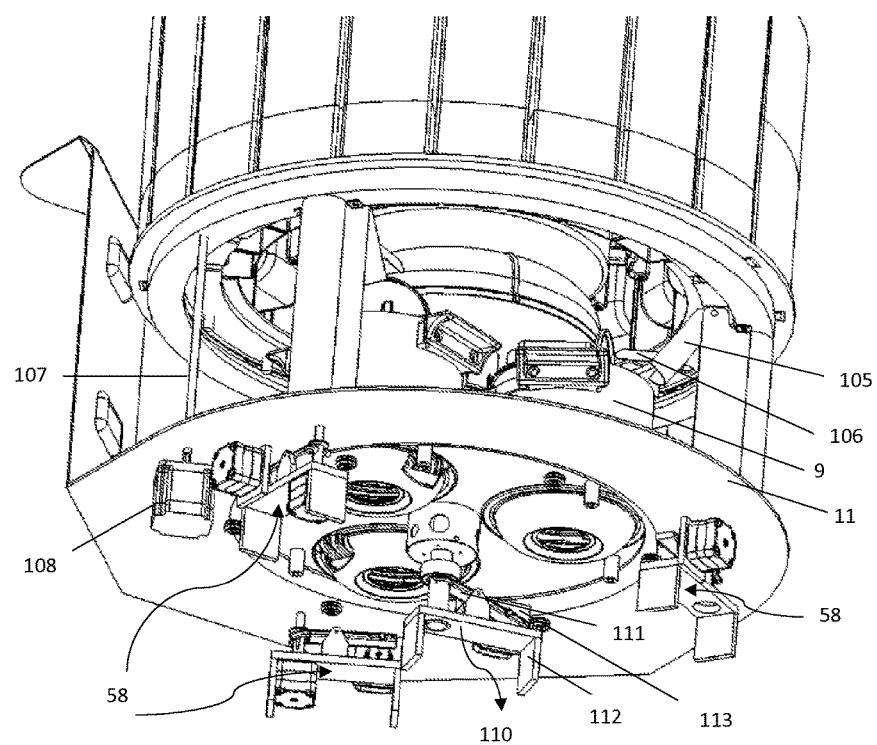
FIG. 16 is an enlarged bottom view of the rotary base.
Figure 17:
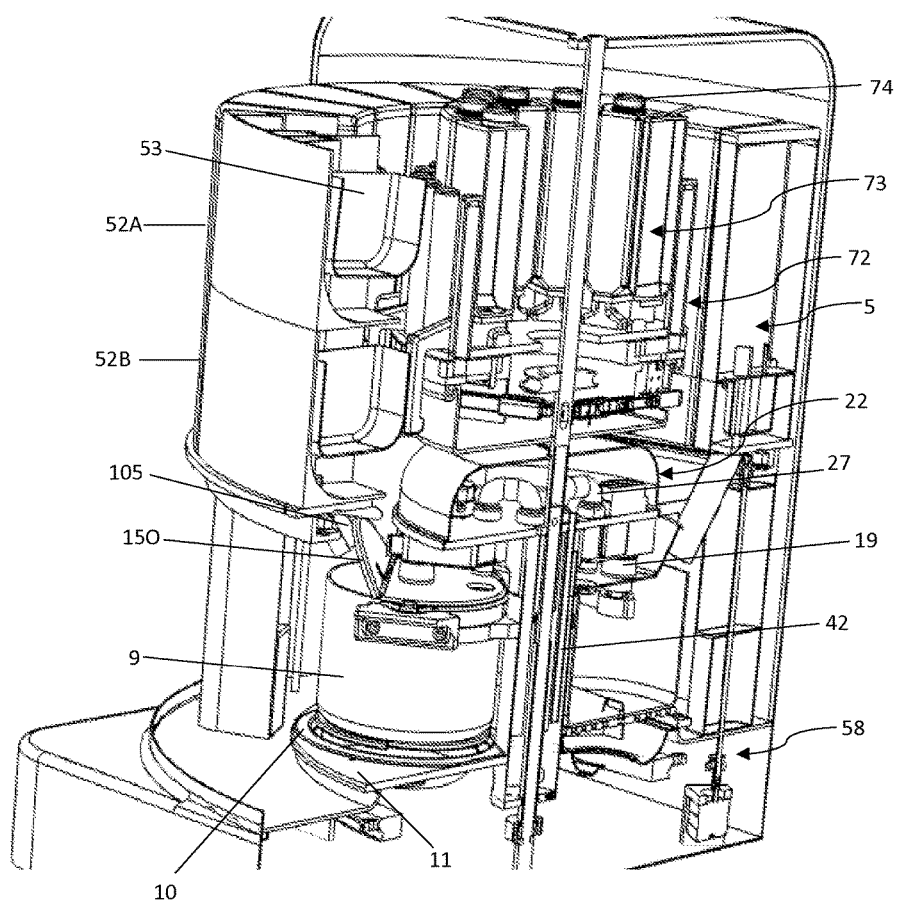
FIG. 17 is a side cross sectional view of cooking machine according to the preferred embodiment.

Details illustrated in FIG. 16, showing the bottom end of the rotary base 11, depicts the lift mechanism 110 that functions in dropping down of the cooker interface assembly 22 on cooking vessel 9. Lift mechanism 110 located under the bottom center of rotary base 11, comprises of lifting fork 111, a stand 112, a camming mechanism connected to it and driving motor 113. Lift mechanism 110 lifts or drop down the cooker interface assembly 22 once a cooking program is selected. Cooker interface assembly 22 drops down for the motor assembly to make contact with the keyed nest 19 of the fixed lid 15F of the cooking vessel 9 once a cooking recipe program is selected by the user as well as after all the internal pre-cooking validations are complete.

Figure 4:
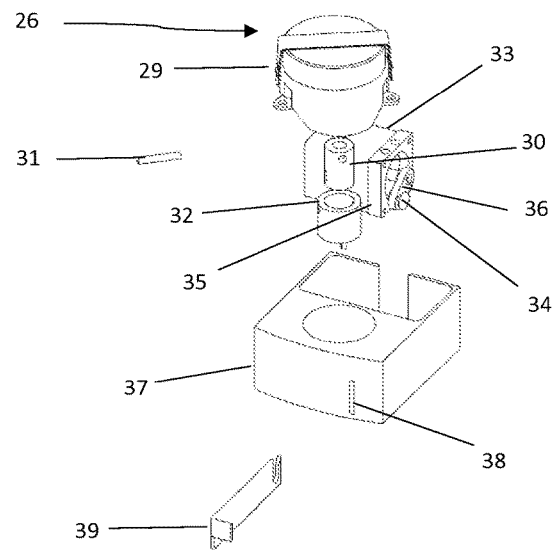
FIG. 4 is an exploded view of the motor assembly present in the cooking interface assembly.

FIG. 4 Illustrates details of motor assembly 26 which comprises of a gear motor 29 that is connected to a motor collar 30 that is activated by guide pin 31. The motor collar 30 is housed into a spring loaded drive key 32 that connects with the keyed nest 19 to activate stirring/mixing mechanism. Motor assembly 26 further comprises of stepper motor 33 that has a linkage arm 34, a stepper motor mount 35, and a pin for interface 36 that contacts activation of lid lift arm 39 and stepper motor mount 35 to hold the stepper motor 33 up.

Drive key 32 and stepper motor 33 is housed in a motor assembly base 37 that has a guided slot 38 in which lid lift arm 39 is placed. The stepper motor 33 of motor assembly 26 drive the lid opening function of 15O and the gear motor 29 of motor assembly 26 drive the stirring/mixing function of stirrer 21. The stepper motor 33 drive lid lift arm 39 through the guided slot 38. Stepper motor 33 drives the stepper arm 34 in a circular motion that is converted to a linear motion of the attached lid lift arm 39. Lid lift arm 39 retracts to engage the tab 16 attached to the lid 15O. This retraction facilitates opening of the lid 15O. When lid lift arm 39 extends out of the guided slot 38 of motor assembly 26 the lid 15O will close. Circular movement of the stepper arm 34 may lead to the full extension of lid lift arm 39 that enables lid opening function of 15O when retracted. Returning to FIGS. 2, 3, and 17, motor assembly 26 locks into keyed nest 19 of the fixed lid part 15F, thus holding the lid 15 in place, upon selection of a cooking recipe program. Based on the recipe specification, motor assembly 26 also enables opening of open lid part 15O to collect dispensed food items in the cooking vessel 9.

Figure 5:
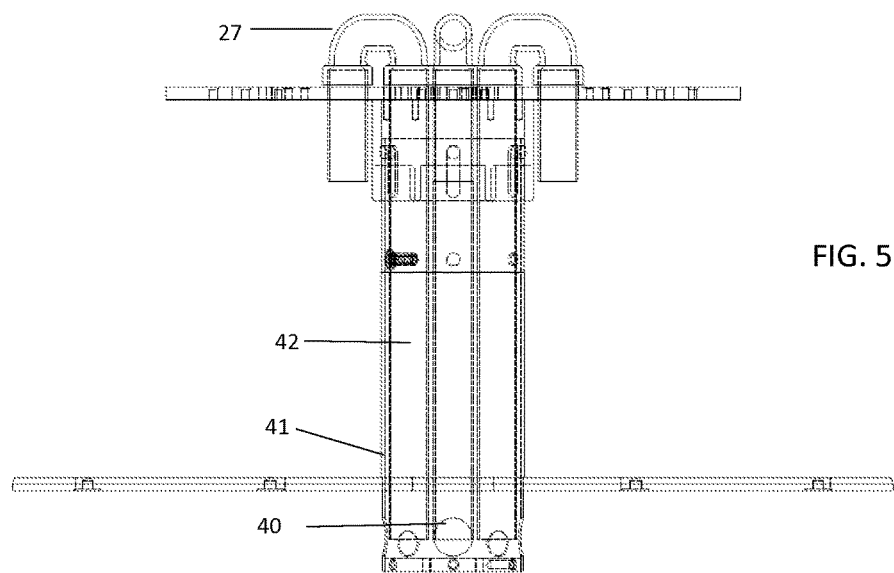
FIG. 5 is a sectional view of exhaust system of the cooking machine.

FIG. 5 illustrates the exhaust system of the automated cooking machine 1. The purpose of the exhaust system is to exhaust waste gases and vapor produced during the cooking process in the cooking vessel 9. The exhaust system outlet 40 is located at the bottom of the rear end 1R of the cooking machine 1. A plurality of fans may be installed at the back of the machine (not shown) to accelerate the vapor exit. Exhaust system outlet 40 is connected to the exhaust system 28 that comprises a vertical pipe 41 that houses plurality of exhaust pipes 42 connected to one end of the inverted U shaped exhaust pipe union 27. Other end 27A of exhaust pipe union 27 makes contact with the exhaust hole 17 of the fixed lid 15F.

Figure 6:
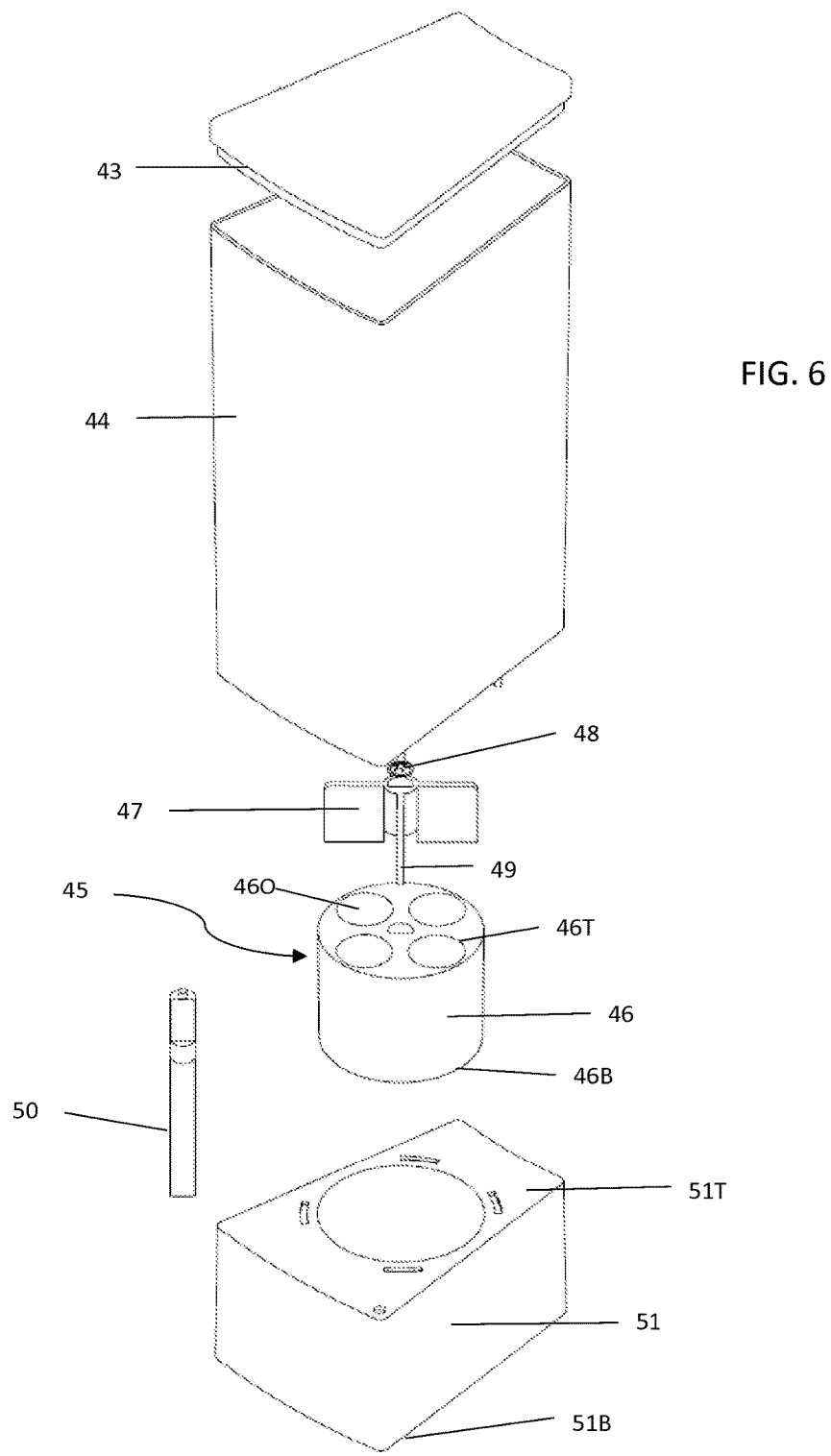
FIG. 6 is an exploded view of dry ingredients storage and dispenser assembly.

FIG. 6 illustrates dry ingredients storage and dispenser assembly 5. The dry ingredients storage and dispenser assembly 5 preferably includes a dry ingredients container lid 43, which fits on dry ingredients container 44 that stores and dispenses measured amount of dry ingredient into cooking vessel 9. Lid 43 is removable and may be used to cover an empty or unused ingredient container 44 to keep the container 44 in a clean condition with no dust depositing in the empty space. Lid 43 can be removed when the container needs to be filled with the dry ingredients and replaced thereafter to prevent the dry ingredients from contamination from dust, bugs, bacteria, or other meal ingredients. This enables storage of the dry ingredients for an extended period of time. Dry ingredients storage and dispenser assembly 5 further comprises of a measuring cup dispenser assembly 45 with a measuring cup dispenser 46 having a top portion 46T and a bottom portion 46B and plurality of openings 46O that extend from 46T to 46B to transfer ingredients from dry ingredients container 44 into cooking vessel 9.

Measuring cup dispenser assembly 45 preferably further comprises of a sifting paddle 47 positioned on the top portion 46T of measuring cup dispenser 46. The volume of the cylinders 46O contains a specified amount of dry ingredients. At any given time, only one cylinder 46O gets filled and only one opening 46O is dispensed per 90° rotation. The sifting paddle 47 has a push nut 48 on its upper end. The bottom of the sifting paddle 47 has a tapering end 49 that is housed inside the measuring cup dispenser 46 and is keyed in the keyed drive shaft 50 present inside the measuring cup dispenser 46. Keyed drive shaft 50 drive the measuring cup dispenser 46 and drive the sifting paddle 47 when engaged. Sifting paddle 47 when engaged, and driven in backward and forward motion with only 180° rotation for each movement, helps to break away ingredients that may get stuck in the dry ingredient container 44 and propel them in the measuring cup dispenser 46. The measuring cup dispenser assembly 45 is housed inside the dry ingredients assembly nest 51 with a top end 51T and bottom end 51B.

Measuring cup dispenser assembly 45 can rotate with up to 360° turn inside the dry ingredients assembly nest 51. The measuring cup dispenser assembly 45 is oriented such that the sifting paddle 47 with push nut 48 is positioned at the top end 51T of dry ingredients assembly nest 51. The bottom end 51B has one opening at the bottom (not shown) that dispenses dry ingredient items into cooking vessel 9. Based on the selected recipe, measured amount of dry ingredients may be dispensed in the measuring cup dispenser assembly 45. Rotation of measuring cup dispenser assembly 45 may lead to alignment of the opening 46O with one opening at bottom of 51B that leads to dispensing of measured amount of dry ingredients into cooking vessel 9. The dry ingredients assembly nest 51 is positioned at the base of dry ingredient container 44 such that the sifting paddle and push nut is in contact with the dry ingredients at the base of dry ingredient container 44.

Figure 7:
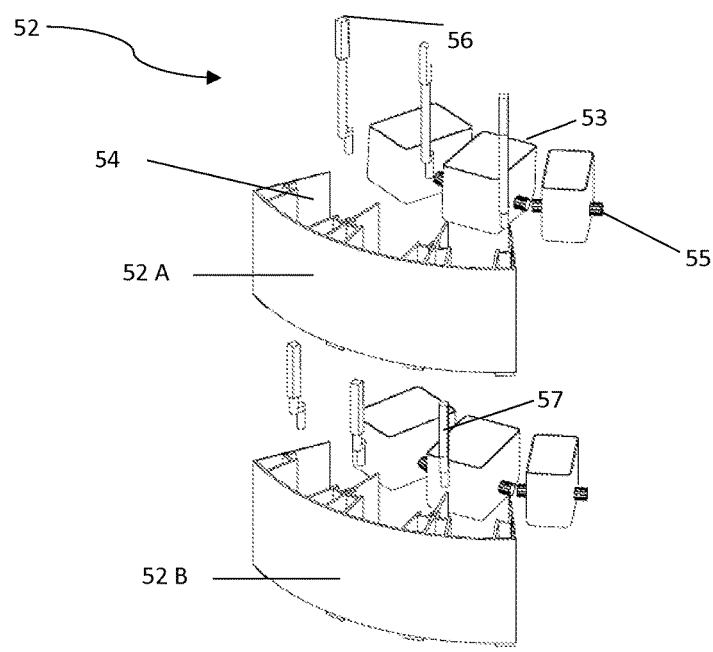
FIG. 7 is an exploded view of refrigerated items dispenser assembly.
Figure 8:
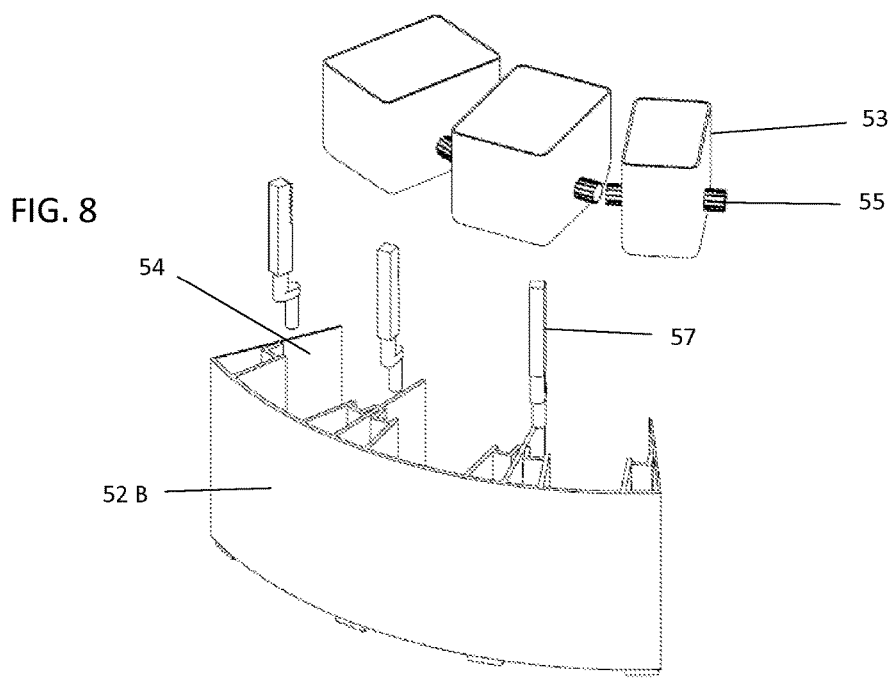
FIG. 8 is an enlarged exploded view of the lower compartment of refrigerated items dispenser assembly.

The illustrative embodiments of FIGS. 7 and 8 show a refrigerated items dispenser assembly 52. The preferred refrigerated items dispenser assembly comprises of an upper compartment 52A and a lower compartment 52B. Each of the compartments 52A and 52B comprises of a plurality of detachable dispensing containers 53 with varying dimensions to accommodate various types of refrigerated and non-refrigerated food ingredients such as vegetables, meat, fruits as per the recipe requirement. Each of the compartments 52A and 52B comprises of plurality of partitions 54 for holding the dispensing containers 53.

Dispensing containers 53 have a cavity on one end to collect refrigerated and non-refrigerated food ingredients. Dispensing containers 53 can be flipped up 180° to empty contents into cooking vessel 9. Dispensing containers 53 may have molded pinion gear 55 on opposite sides to rotate 53. Refrigerated items dispenser assembly 52 further comprises of a plurality of extended rack gear 56 with longer shafts that get lifted vertically and pushes on to the pinion gear 55 which may enable up to 180° flipping of dispensing containers 53 contained in the upper compartment 52A.

Refrigerated items dispenser assembly 52 further preferably comprises of a plurality of rack gear 57 with comparatively smaller shafts that get lifted vertically and pushes the pinion gears 55 of dispensing containers 53 in the lower compartment 52B and may enable up to 180° flipping of dispensing containers 53 contained in the lower compartment 52B. The extended rack gear 56 and rack gear 57 is pushed by the stepper 71 used in drive shaft assembly 58 which in turn rotates the pinion gear 55. It is the linear motion of the rack gear that rotates the dispensing containers 53 via pinion gear 55.

As illustrated in FIG. 1, food ingredient dispensed by dispensing container 53 is funneled into the cooking vessel 9 through a guiding funnel 105 that in turn is hinged and the connecting pivoting tab 106 mates with 15O. Mating of 106 with 15O may result in movement of guiding funnel 105 from its resting position to its elevated position that gets directed into the cooking vessel 9.

Figure 9:
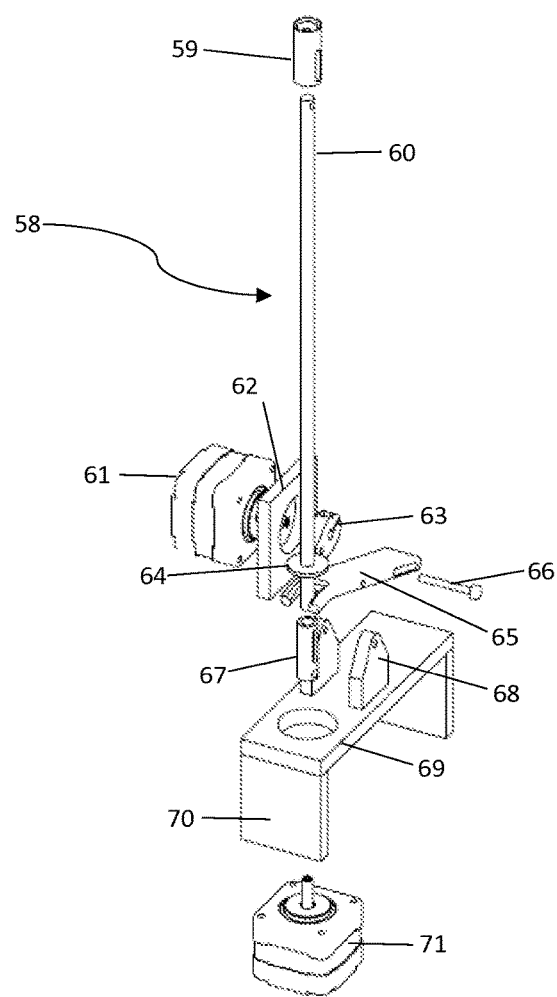
FIG. 9 is an exploded view of the drive shift assembly.

FIG. 9 illustrates the preferred drive shaft assembly 58 Part of the drive shaft assembly 58 is located under the rotary base 11 as shown in FIG. 16 and remaining part comprising of vertical shaft 60 and spring loaded drive key 59 is housed in drive shaft assembly housing 12 as seen in FIG. 1. As shown in FIG. 9, drive shaft assembly 58 has spring loaded drive key 59, vertical shaft 60, linear stepper motor 61 that activates linear motion through a cam and lifting fork, mounting plate for cam stepper 62, cam collar 63, lift and drive shaft 64, lift fork 65, drive shaft cam follower 66, spring loaded shaft collar 67, fork pivot 68, fork mounting plate 69, drive shaft stand 70, base stepper motor 71.

The drive shaft assembly 58 enables dispensing of both refrigerated items from refrigerated items upper compartment 52A and refrigerated items lower compartment 52B and also dry food ingredients from dry ingredients container 44. The spring loaded drive key 59 is positioned at one end of vertical shaft 60 and mates with the rack gears 57 to create the necessary linear motion needed to drive to drive the rack gears 57 in order to flip dispensing containers 53. Spring loaded drive key 59 may also mate with the dry ingredients keyed shaft (not shown) to drive the rotary action needed to dispense the dry ingredients into cooking vessel 9.

FIG. 16 illustrates in more detail, the bottom portion of the rotary base 11 that shows part of the drive shaft assembly further comprising of drive shaft 107 and a drive motor 108 that rotates the dry ingredient storage and dispenser assembly 5 and refrigerated items dispenser assembly 52.

Figure 10:
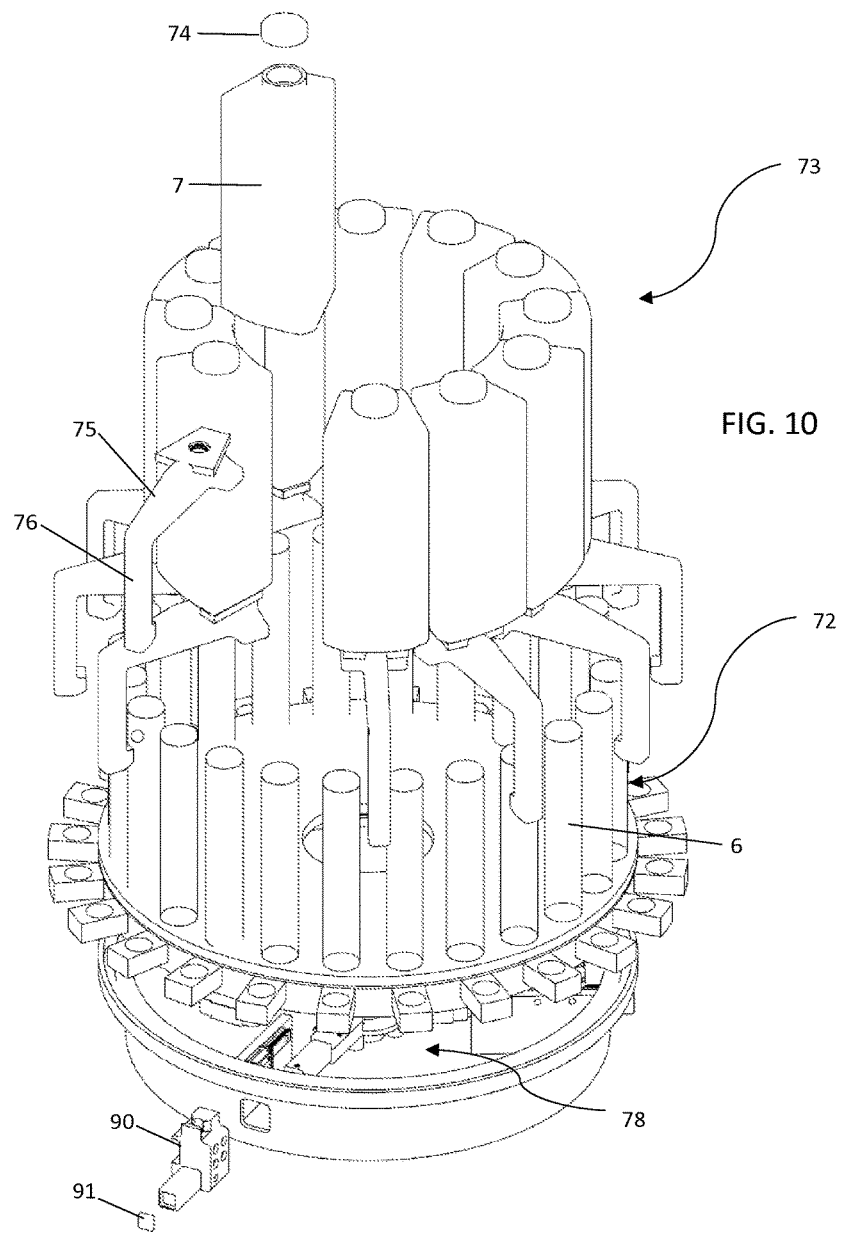
FIG. 10 is an exploded view of the spice storage and dispenser assembly, liquid storage and dispenser assembly and the linear actuator assembly.
Figure 12:
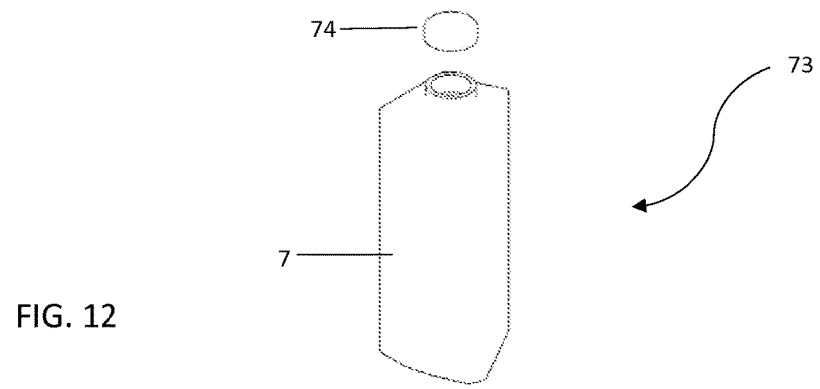
FIG. 12 is an exploded view of liquid storage and dispenser assembly.

FIG. 10 illustrates the preferred spice storage and dispenser assembly 72, liquid storage and dispenser assembly 73, and a linear actuator assembly 78. An exploded perspective of the preferred liquid storage and dispenser assembly 73 as illustrated in FIG. 12 shows details of the assembly. The liquid storage and dispenser assembly 73 comprises of a plurality of liquid containers 7. Each liquid container 7 comprises of an opening at the one end that is capped by a liquid container cap 74.

At the other end of liquid container 7, is another opening that is connected to a liquid dispenser 75. Liquid dispenser 75 has a check valve 76. Fitted within the check valve 76 is a magnetic ball 77 that gets displaced by a spice pin magnet 91 to allow flow of fluid. The liquid storage and dispenser assembly 73 utilizes gravity and dispensing time to measure the amount of liquid dispensed in the cooking vessel 9.

Figure 11:
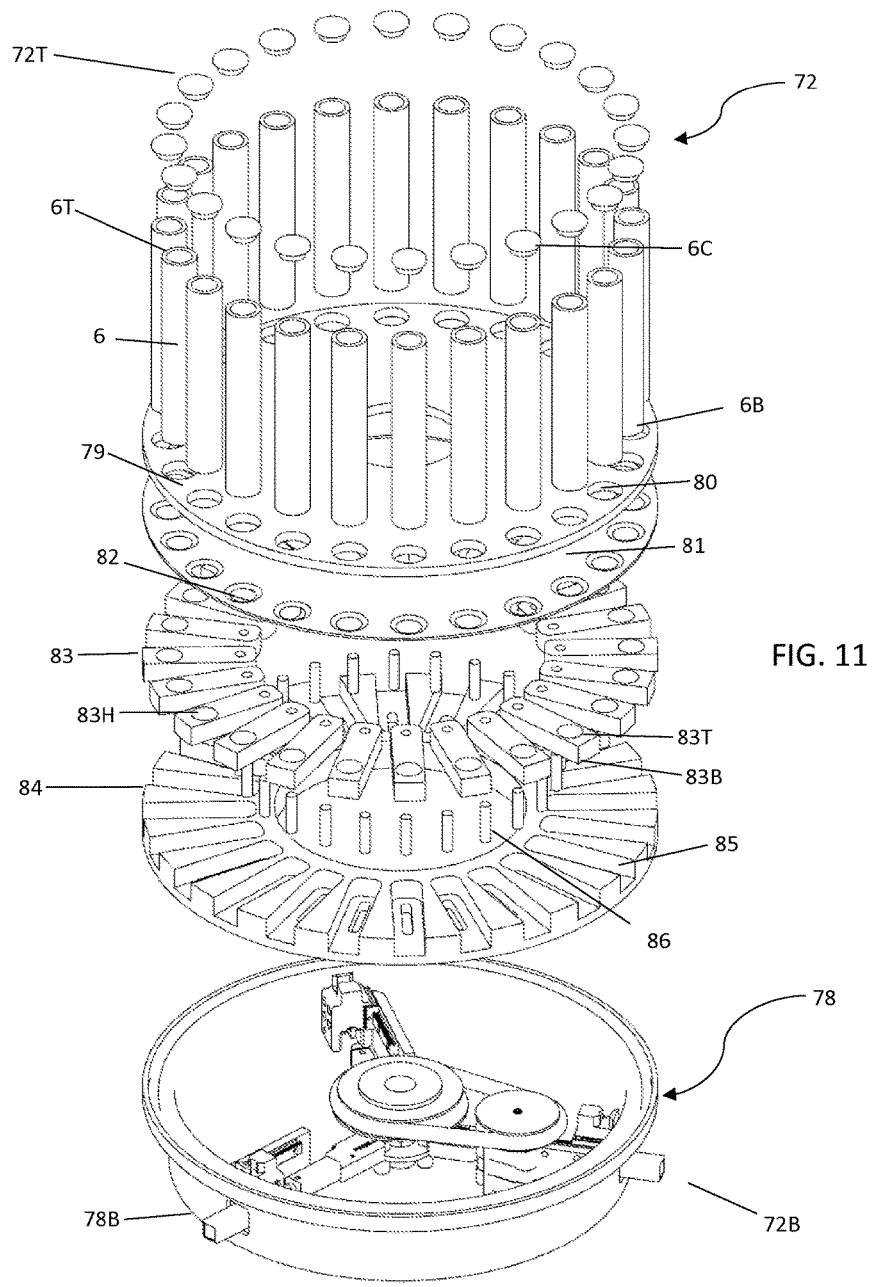
FIG. 11 is an exploded view of spice storage and dispenser assembly and linear actuator assembly.

FIG. 11 illustrates the preferred spice storage and dispenser assembly 72, and a linear actuator assembly 78. As shown, spice storage and dispenser assembly 72 has a top 72T and bottom 72B. Spice storage and dispenser assembly comprises of a plurality of spice containers 6. Each spice container 6 comprises of an opening at top end 6T that is capped by spice container cap 6C that protects the stored spices in spice container from humidity, contaminants, dust, and bugs.

The bottom end of spice container 6B is nested into spice container nest 79 preferably on spice container nest holes 80. Spice container nest 79 is positioned upon spice shear plate 81 that have spice shear plate holes 82. Spice shear plate holes 82 may have sharp edges enabling shearing of the spice while being dispensed. Spice shear plate holes 82 preferably align with spice container nest holes 80. Spice shear plate 81 is mounted upon spice dispenser 83 that sits on spice dispenser nest 84 such that spice dispenser 83 is aligned within the spice dispenser grooves 85.

Spice dispenser 83 comprises of a top side 83T and bottom side 83B and a hole 83H from 83T to 83B. 83H has a cross section that matches with 82, 80 and 6B. 83H may have a depth that accommodates a measured unit of spice. Spice dispenser driving pin 86 enables locking of spice dispenser 83 onto the spice dispenser nest 84. Spice storage and dispenser assembly 72 further comprises of linear actuator motor assembly 78 at the bottom of spice storage and dispenser assembly 72B.

Figure 13:
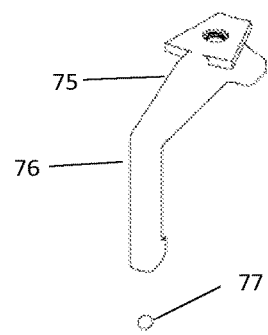
FIG. 13 is an exploded view of linear actuator assembly.
Figure 13:
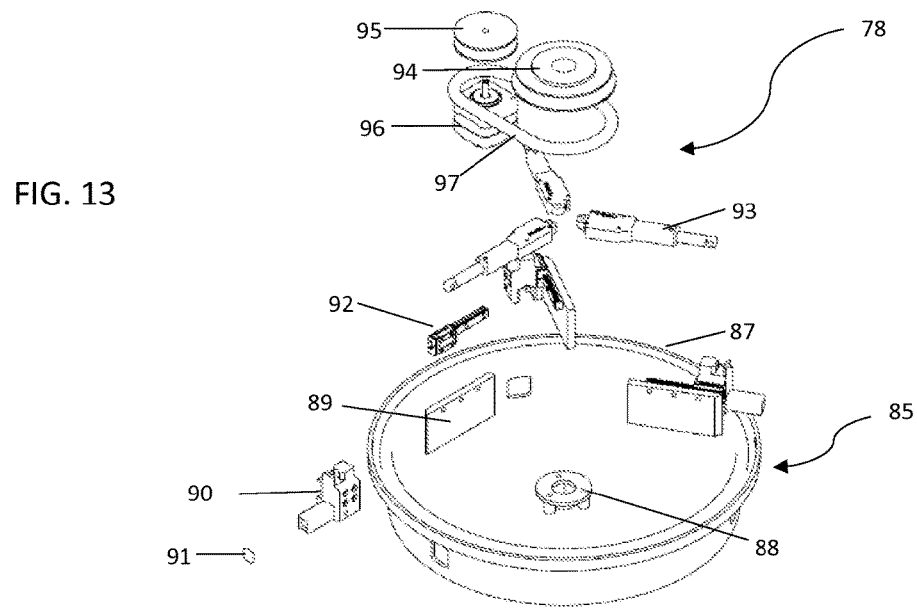

Turning momentarily to FIG. 13, spice pin and magnet nest 90 has a slot that catches the dispenser driving pin 86 when engaged, and result in sliding of the spice dispenser in backward and forward direction. The spice dispenser 83 when completely retracted in 85 by movement of the dispenser driving pin 86, may align with shear plate holes 82 and collect spice dispensed through spice container 6. Upon forward movement of spice dispenser 83, the specific spice gets dispensed into cooking vessel 9.

As illustrated in FIG. 13, linear actuator motor assembly 78 comprises of a linear actuator motor assembly base 87, circular rotary disc 88, THK mount 89, spice pin and magnet nest 90, liquid dispenser magnet 91, THK linear slide 92, linear actuator 30 mm 93, Turn table pulley 94, drive pulley 95, turn table stepper motor 96, and O Ring 97. The linear actuator assembly 78 drives both the spices storage and dispenser assembly 72 and liquid storage and dispenser assembly 73.

Figure 18:
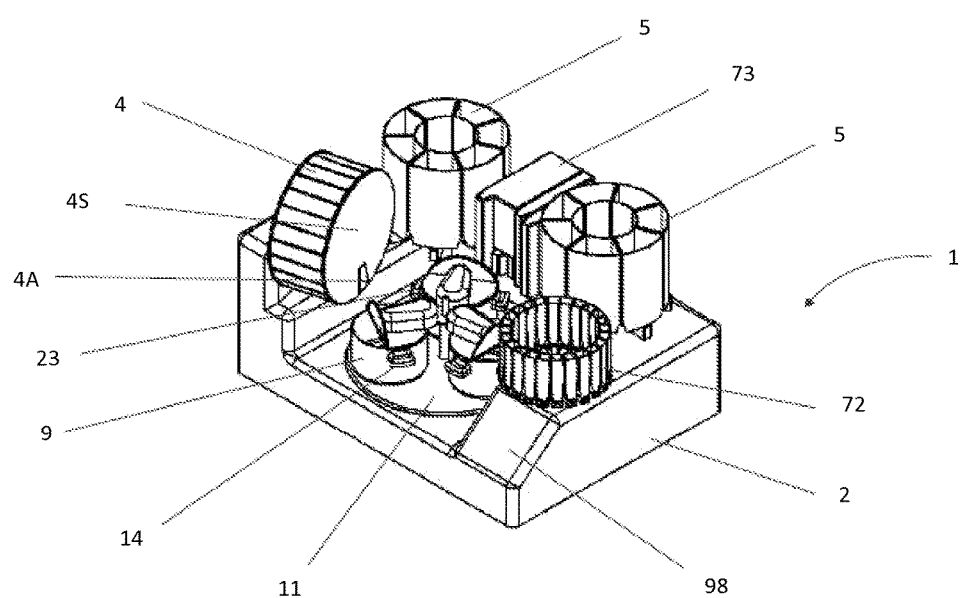
FIG. 18 is a perspective view of an alternate embodiment.

FIG. 18 shows an alternative embodiment of the automated multi-dish cooking machine 1. The cooking machine 1 housed in a housing 2 and comprises of a plurality of cooking vessels 9, rotary base 11, dispensing systems 4, 5, 72, and 73 communicable with cooking machine 1, program control system 98, an exhaust vent (not shown), and a lid for the housing (not shown).

In further detail, referring to FIG. 18, the cooking machine 1 may be housed in a housing 2 preferably made up of stainless steel, plastic or any anticorrosive material with four or more adjustable feet (not shown). The rotary base 11 comprises of a heating element (not shown) that is heated with electric power controller through the miniature computer (not shown) or actual microcontroller (not shown) that can respond to the cooking recipe programmed by the user such as by increasing heat, decreasing heat, and increasing or decreasing time at a certain temperature. Heating elements may be coil or ceramic based (not shown).

Figure 19:
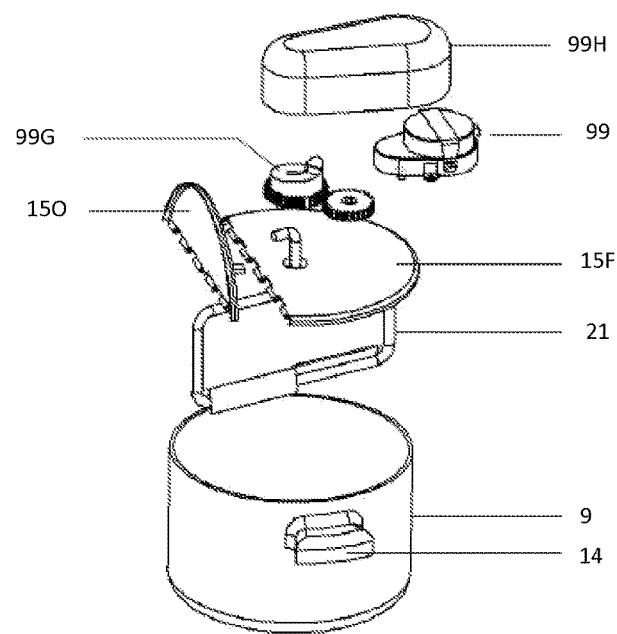
FIG. 19 is an exploded view of the cooking vessel along with the lid of the alternate embodiment.

Referring to FIG. 19, cooking vessels 9 has a base portion to hold contents dispensed from dispenser 4, 5, 72, and 73. Cooking vessel 9 comprises of one or more detachable handles 14 on the outer surface preferably made of a heat resistant material such as silicon. The cooking vessels 9 have a lid 15 that comprises of a fixed lid part 15F and an open lid part 15O that can be opened and closed. The fixed lid part 15F is connected to a stirrer 21 on the lower portion of the fixed lid part 15F of the lid 15 facing the inside of the cooking vessel 9. The stirrer 21 is affixed to a lid motor assembly 99 on the upper portion of the lid 15. The lid motor assembly 99 comprises of lid motor gears 99G that mate with the stirrer attachment 21 on the top of the fixed lid part 15F. This lid motor assembly 99 is housed in a lid motor assembly housing 99H.

Returning to FIG. 18, cooking machine 1 includes spice storage and dispenser assembly 72 comprising of one or more compartments configured to store and dispense spices in cooking vessel 9. Cooking machine 1 further includes a liquid storage and dispenser assembly 73 comprising of one or more compartments for storing liquids for cooking such as oil, water, vinegar, additional custom sauce, wine, soy sauce or any other liquid used for cooking. The liquid storage and dispenser assembly 73 can be connected to a peristaltic pump (not shown) for dispensing required amount of liquid based on selected recipe.

Cooking machine 1 further includes a plurality of dry ingredient storage and dispenser assembly 5 comprising of one or more compartments configured to store solid, dry and semi-dry ingredients. The dry ingredient storage and dispenser assembly 5 are configured to transport ingredients from one or more compartments to the cooking vessel. Cooking machine 1 further comprises of refrigerated storage dispenser 4 comprising of one or more compartments engraved with alpha numerical characters (not shown) configured to store main ingredients for the meal.

Refrigerated storage dispenser 4 may also be coupled to a refrigeration unit (not shown). Refrigerated storage dispenser 4 may be detached from the cooking apparatus as a whole unit and refrigerated before use. Refrigerated storage dispenser 4 is configured to transport main ingredients from one or more compartments to the cooking vessel. Refrigerated storage dispenser has an aperture 4A situated at base portion of the side wall 4S of refrigerated storage dispenser 4 for dispensing measured main ingredients to the cooking vessels 9.

The user can program the dispensing systems 4, 5, 72, and 73 according to desired actions or allow execution of pre-programmed recipe. The programs related to dispensing the ingredients can include information such as when to add one or more ingredients and their amount at the proper time, stirring option, and temperature during the preparation of meal in the cooking vessel. The programmed recipe is stored in the memory assembly (not shown) in the control panel 98.

In further detail, still referring to FIG. 18, dispensing system 4, 5, 72 and 73 are connected to a pre-calibrated measurement (not shown). Dispensing system 5, 72 and 73 have an aperture (not shown) and 4 has an aperture 4A at the base of the sidewall 4S, such that, when the compartment of dispensing system 4, 5, 72 and 73 are suitably rotated above the cooking vessels 9, programmed by the selected recipe, the aperture opens and allows measured dispensing of needed ingredient in the cooking vessels 9 with minimal exposure to the cooking steam emanating from cooking vessels 9. Dispensing system 4, 5, 72 and 73 comprises of an assembly of pre-fabricated cylinders (not shown) that can be filled with desirable amount of ingredients as per the recipe by a motor driven apparatus (not shown). To vent out the excess humidity and vapors during cooking, cooking machine 1 may be provided with an air circulation element, including an exhaust fan (not shown) and exhaust vent (not shown).

In further detail, still referring to FIG. 18, the control panel 98 enables selecting the programs for cooking and is connected to the computer or processor based microcontroller PCB housed in waterproof isolated enclosure (not shown). The control panel controls the temperature of the heating device 10. Temperature sensors (not shown) that sense the temperatures of cooking vessels 9 are connected to control panel through cable casing path (not shown). Rotation, positioning of dispensing system 4, 5, 72 and 73 are controlled via control panel 98. Control Panel 98 also provides automatic and manual controls of opening and closing of 15O on the cooking vessels 9 based on the recipe as needed. The cooking machine 1 operates on both 240 V, 50 HZ and 120 V, 60 HZ input supply. Automated multi-dish cooking machine 1 is connected to built-in power surge protector (not shown) to prevent damages from any high current surges.

While embodiments of the disclosure have been described in terms of various specific embodiments, those skilled in the art will recognize that the embodiments of the disclosure may be practiced with modifications within the spirit and scope of the claims.

What is claimed is:

1. A device for cooking more than one dish at a time comprising:
    a plurality of removable cooking vessels supported by a base, each cooking vessel having a heating unit configured to heat the contents of the cooking vessel,
    a dispenser above the cooking vessels, the dispenser comprising at least one dispenser selected from the group of a liquid dispenser, a refrigerated liquid dispenser, a solid dispenser, a refrigerated solid dispenser and a spice dispenser,
    the dispenser further comprising a measuring assembly to measure the required amount of ingredient as per the programmed recipe, the measuring assembly comprising a measuring cup dispenser assembly and a liquid dispenser assembly,
    the measuring cup dispenser assembly comprises a rotating measuring cup dispenser having a top portion and a bottom portion, a plurality of openings extending from the top portion to the bottom portion and a sifting paddle positioned on top portion of the measuring cup dispenser,
    the liquid dispenser assembly comprises a plurality of liquid containers connected to a liquid dispenser comprising a check valve that utilizes gravity and dispensing time to measure the amount of liquid dispensed,
    the dispenser configured to add a plurality of ingredients in each of the plurality of cooking vessels.

2. The device of claim 1 further comprising a microprocessor coupled to a memory wherein the microprocessor is programmed to control the heating unit and control the dispenser.

3. The device of claim 1, where in the base is configured to rotate about a center axis.

4. The device of claim 3 further comprising a cooker interface assembly, the cooker interface assembly houses a stirrer motor and a lid actuator motor, the cooker interface assembly moves up and down by a lift mechanism under the rotary base to matingly engage the stirrer motor with a stirrer and to allow a lid lift arm of the lid actuator motor to engage a tab on a cooking vessel lid to open and close the cooking vessel lid.

5. The device of claim 1, the spice dispenser comprising a plurality of tube-shaped containers, each tube-shaped container comprising a bottom end,
    a slidable element having a top side, a bottom side, and a hole from the top side to the bottom side of the slidable element, the hole having a cross-section that matches the bottom end of the tube-shaped container and the hole further comprising a depth,
    a dispensing plate having a slot for receiving the slidable element, the slot having a solid bottom face, and
    an actuator for moving the sliding element in the slot until the hole aligns with the bottom of the tube shaped container and allowing granular material to fill a fixed volume bounded by the hole and the bottom of the slot and returning the sliding element back to its original position and allowing the fixed volume of granular material to fall through the hole.

6. The device of claim 1, wherein the solids dispenser is a container housing a base for receiving a rotatable chamber, the rotatable chamber having a plurality of vertically oriented tubes, each tube running through the rotatable chamber from a top to a bottom, at the top of the rotatable chamber is a rotatable paddle, the rotatable paddle configured to rotate and push any solids in the container into the tops of the plurality of tubes, the base having a hole that aligns with each tube once during a complete rotation of the rotatable chamber to allow any solids in an aligned tube to drop into a cooking vessel below.

7. The device of claim 1, the liquid dispenser comprising, a bottom spout located at a bottom of the liquid dispenser and a metal ball inside the liquid dispenser, the bottom spout comprising a tapered section configured to trap the metal ball and plug the spout when liquid is in the dispenser, and a a magnet for moving the metal ball away from the tapered section and allowing liquid to dispense from the spout.

8. The device of claim 1 further comprising, a drive unit assembly, the drive unit assembly comprising a dual-action trigger, the drive unit assembly configured to rotate the liquid dispenser assembly and the spice dispenser assembly about a central axis, the spice dispenser comprising a plurality of tube-shaped containers, each tube-shaped container comprising a bottom end, a slidable element having a top side, a bottom side, and a hole from the top side to the bottom side of the slidable element, the hole having a cross-section that matches the bottom end of the tube-shaped container and the hole further comprising a depth, a dispensing plate having a slot for receiving the slidable element, the slot having a solid bottom face, a liquid container having a bottom spout located at a bottom of the liquid container and a metal ball inside the liquid container, the bottom spout comprising a tapered section configured to trap the metal ball and plug the spout when liquid is in the dispenser, the dual action trigger connected to the drive unit assembly, the dual action trigger comprising a magnet for moving the metal ball away from the tapered section and allowing liquid to dispense from the spout and an actuator for moving the sliding element in the slot until the hole aligns with the bottom of the tube shaped container and allowing granular material to fill a fixed volume created by the hole and the bottom of the slot and returning the sliding element back to its original position and allowing the fixed volume of granular material to fall through the hole.

9. An ingredient dispensing apparatus for use with an automated multi-dish cooking device, the ingredient dispensing apparatus comprising, a drive unit assembly, the drive unit assembly comprising a dual-action trigger, the drive unit assembly configured to rotate a liquid dispenser assembly and a granular dispenser assembly about a central axis, the granular dispenser comprising a plurality of tube-shaped containers, each tube-shaped container comprising a bottom end, a slidable element having a top side, a bottom side, and a hole from the top side to the bottom side of the slidable element, the hole having a cross-section that matches the bottom end of the tube-shaped container and the hole further comprising a depth, a dispensing plate having a slot for receiving the slidable element, the slot having a solid bottom face, a liquid container having a bottom spout located at a bottom of the liquid container and a metal ball inside the liquid container, the bottom spout comprising a tapered section configured to trap the metal ball and plug the spout when liquid is in the dispenser, the dual action trigger connected to the drive unit assembly, the dual action trigger comprising a magnet for moving the metal ball away from the tapered section and allowing liquid to dispense from the spout and an actuator for moving the sliding element in the slot until the hole aligns with the bottom of the tube shaped container and allowing granular material to fill a fixed volume created by the hole and the bottom of the slot and returning the sliding element back to its original position and allowing the fixed volume of granular material to fall through the hole.

10. The device of claim 9 further comprising a microprocessor coupled to a memory wherein the microprocessor is programmed to rotate the liquid dispenser assembly and the granular dispenser assembly about a central axis and to control the dual action trigger.

11. The device of claim 9 further comprising a container for dispensing solids, the container comprising a base for receiving a rotatable chamber, the rotatable chamber having a plurality of vertically oriented tubes, each tube running through the rotatable chamber from a top to a bottom, at the top of the rotatable chamber is a rotatable paddle, the rotatable paddle configured to rotate and push any solids in the container into the tops of the plurality of tubes, the base having a hole that aligns with each tube once during a complete rotation of the rotatable chamber to allow any solids in an aligned tube to drop into a cooking vessel below.

12. The device of claim 9 further comprising a cooker interface assembly, the cooker interface assembly houses a stirrer motor and a lid actuator motor, the cooker interface assembly configured to matingly engage the stirrer motor with a stirrer and to allow a lid lift arm of the lid actuator motor to engage a tab on a cooking vessel lid to open and close the cooking vessel lid.

13. The device of claim 9 further comprising a refrigerated item assembly, the refrigerated item assembly comprising a container having an open top, the container rotatable about a horizontal axis and configured to dump the contents of the container.

14. The device of claim 9 further comprising a plurality of removable cooking vessels supported by a rotary base, each cooking vessel having a heating unit configured to heat the contents of the cooking vessel, the rotary base located underneath the granular dispenser and liquid dispenser.

15. A device for cooking at least two meals at different times, the device comprising:

at least two storage devices selected from the group consisting of a dry ingredient storage device, a spice storage device, a liquid storage device, a refrigerated liquid storage device, a refrigerated food items storage device each storage device further comprising a measuring apparatus and a dispensing apparatus for adding a measured amount of an ingredient to a cooking vessel located below the storage devices, and wherein the storage devices are configured to hold ingredients for multiple meals so that the device can dispense a measured amount to the cooking vessel as directed by the user for a first meal at a first point in time and a second meal at a second point in time.

16. The device of claim 15 further comprising a microprocessor coupled to a memory wherein the microprocessor is programmed to control a heating unit located under the cooking vessel, control the measuring apparatus and control the dispensing apparatus.

17. The device of claim 15, the spice storage device comprising a plurality of tube-shaped containers, each tube-shaped container comprising a bottom end, a slidable element having a top side, a bottom side, and a hole from the top side to the bottom side of the slidable element, the hole having a cross-section that matches the bottom end of the tube-shaped container and the hole further comprising a depth, a dispensing plate having a slot for receiving the slidable element, the slot having a solid bottom face, and an actuator for moving the sliding element in the slot until the hole aligns with the bottom of the tube shaped container and allowing granular material to fill a fixed volume bounded by the hole and the bottom of the slot and returning the sliding element back to its original position and allowing the fixed volume of granular material to fall through the hole.

18. The device of claim 15, the dry ingredient storage device comprising a container for dispensing solids, the container comprising a base for receiving a rotatable chamber, the rotatable chamber having a plurality of vertically oriented tubes, each tube running through the rotatable chamber from a top to a bottom, at the top of the rotatable chamber is a rotatable paddle, the rotatable paddle configured to rotate and push any solids in the container into the tops of the plurality of tubes, the base having a hole that aligns with each tube once during a complete rotation of the rotatable chamber to allow any solids in an aligned tube to drop into a cooking vessel below.

19. The device of claim 15, the liquid storage device comprising,
a bottom spout located at a bottom of the liquid storage device and a metal ball inside the liquid storage device, the bottom spout comprising a tapered section configured to trap the metal ball and plug the spout when liquid is in the liquid storage device, and a
a magnet for moving the metal ball away from the tapered section and allowing liquid to dispense from the spout.

20. The device of claim 15 further comprising,
a drive unit assembly, the drive unit assembly comprising a dual-action trigger, the drive unit assembly configured to rotate the spice storage device, the liquid storage device and the dry ingredient storage device about a central axis, and
a dual action trigger connected to the drive unit assembly, the dual action trigger comprising a magnet for moving the metal ball away from the tapered section and allowing liquid to dispense from the spout and an actuator for moving the sliding element in the slot until the hole aligns with the bottom of the tube shaped container and allowing granular material to fill a fixed volume created by the hole and the bottom of the slot and returning the sliding element back to its original position and allowing the fixed volume of granular material to fall through the hole.

* * * * *